Aug. 22, 1950
M. P. TAYLOR
2,519,721
CLAMPING AND SHOCK ABSORBING DEVICE
Filed May 12, 1944
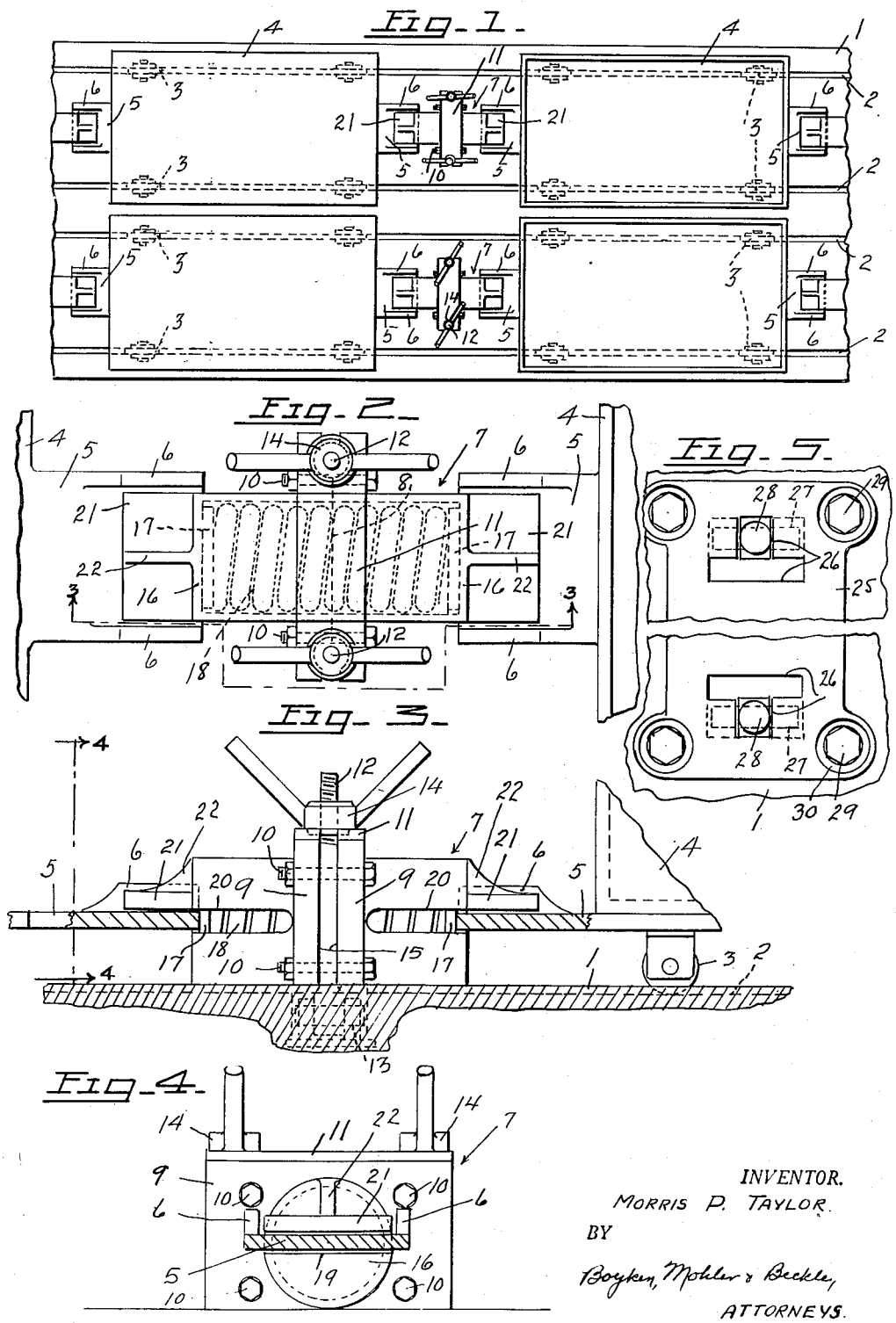
INVENTOR.
MORRIS P. TAYLOR.
BY
Boyken, Mohler & Beckley,
ATTORNEYS.

Patented Aug. 22, 1950

2,519,721

UNITED STATES PATENT OFFICE 2,519,721

CLAMPING AND SHOCK ABSORBING DEVICE

Morris P. Taylor, Stanford University, Calif.

Application May 12, 1944, Serial No. 535,389

5 Claims. (Cl. 105—366)

This invention relates to a clamping and shock absorbing device for use in combination with portable freight carriers that are to be clamped to the floor of a vehicle such as a railway car, steamship, aircraft, truck, etc.

One of the objects of the invention is the provision of improved means for holding portable freight carriers to the floor of any air, water or land vehicle, and which means is simple and is adapted to be quickly manipulated for effecting the securement of freight carrier to such floor and for releasing such freight carrier for handling of the latter.

Another object of the invention is the provision of improved means for holding portable freight carriers to the floor of a vehicle in spaced relation on such floor, and which means also functions as a shock absorber for reducing the effect of undesirable shocks on the carriers, which shocks would otherwise be likely to result in injury to the freight carried by said carriers, or in undesirable displacement thereof, or in injury to the carriers.

A still further object of the invention is the provision of a combination between one or more portable truck carriers and the floor of a vehicle on which such carriers are supported, and a special connector between such floor and one or more of such carriers for holding the latter against undesirable movement while absorbing shocks transmitted to the carriers and for spacing adjacent pairs of such carriers.

Other objects and advantages will appear in the drawings and in the description.

In the description it is to be understood that the term "vehicle" may refer to any land, water or air vehicle, and the term "carrier" may refer to any carrier for freight that is normally movable relative to the floor of the vehicle on which such carrier is supported. Also the drawings and description are merely illustrative of the invention and are not to be considered restrictive thereof.

In the drawings,

Fig. 1 is a plan view of a vehicle floor on which a plurality of freight carriers are secured by the clamping and shock absorbing devices.

Fig. 2 is an enlarged plan view of one of the clamping and shock absorbing devices of Fig. 1, a fragment of each of the carriers at opposite sides thereof being also shown.

Fig. 3 is a sectional view taken generally along line 3—3 of Fig. 2.

Fig. 4 is a sectional view taken along line 4—4 of Fig. 3.

Fig. 5 is an enlarged plan view of a floor plate and removable clamping bolts that may be used with the clamping and shock absorbing devices of Figs. 1 to 4.

In detail, referring to Figs. 1, 3, the floor of a vehicle is indicated at 1. Said floor may be formed with tracks 2 in the form of parallel, spaced channels for receiving the wheels 3 of freight carriers 4. The carriers 4 may be placed on the floor with their wheels in said tracks, or they may be removed therefrom, by any suitable means, one of which is shown in my United States Letters Patent No. 2,088,122, of July 27, 1937. In any event, it is seen that the tracks cooperate with the wheels of the carriers to prevent transverse movement of the carriers relative to said tracks while permitting the carriers to move longitudinally of said tracks. Each pair of tracks is adapted to support a row of carriers 4 thereon in end to end relation, and each of said carriers may be formed to provide a container for freight or a platform for freight-holding containers.

The opposite ends of the carriers 4 that are over the tracks 2 have projections 5 that project horizontally from the carrier. Each such projection may be an extension of the bottom of the carrier, and the lateral sides of each such projection may have opposed, upstanding, spaced ribs formed thereon. Such projections are preferably centrally of the opposite ends of the carriers so as to extend over the portion of the floor 1 that is between tracks 2, although it is obvious that the entire floor of the carrier may be extended at its ends, and the ribs 6 may project upwardly of said floor.

When carriers 4 are in their desired positions on the floor 1, they are secured to said floor by elongated members 7. These members are hollow, and elongated longitudinally of said tracks and are respectively positioned at opposite ends of each carrier. Where the carriers 4 are in a row on tracks 2, each member 7 that is between an adjacent pair of carriers functions to hold the adjacent ends of said pair to the floor as well as to space the said adjacent ends apart.

Each member 7 may be cylindrical and split transversely along line 8 (Fig. 2) into halves that are formed with laterally projecting flanges 9 (Fig. 3) at their adjacent ends. Bolts 10 extending through said flanges secure the halves together.

The flanges 9 preferably are rectangular in outline (Fig. 4) thus providing a flat base for supporting the member 7 on the floor against any tendency thereof to roll, and also providing a flat upper surface on which is positioned a plate 11 that extends transversely of the member 7 and across the juncture between the halves of said member parallel with the line 8 that defines said junction. This plate 11 is bifurcated at its ends for receiving the outer ends of hold-down bolts 12. The other ends of said hold-down bolts may be secured by pivots 13 (Fig. 3) to the floor 1 for swinging of the said outer ends (laterally relative to member 7) into and out of the bifurcated ends of plate 11. Wing nuts 14 or hand wheels or any other suitable type of nut is threaded on the outer end of each bolt 12 for tightening against the ends of each plate 11 for thereby holding each member 7 to the floor 1. If desired the adjacent edges of flanges 9 that extend along bolts 12 may be recessed to form channels 15 for receiving bolts 12 therein (Fig. 3), whereby each of the members 7 is precluded from any possibility of being shifted about its vertical axis.

The opposite ends of each member 7 are each formed with a head 16, and an annular or circular disk 17 is yieldably held against each of said heads by a relatively heavy coil spring 18 (Fig. 2) that extends between said disks. Also each head 16 is transversely slotted as at 19 (Fig. 4) for receiving therein the portion of each projection 5 on each carrier 4 that is disposed between the ribs 6 when the member 7 is secured to floor 1 between carriers or at either end of a carrier. The ribs 6 lie closely alongside opposite sides of member 7, thus functioning as guides as well as providing a means for preventing transverse shifting of carriers 4 even when the tracks 2 and wheels 3 thereof are omitted.

In order to permit the spring 18 in each member 7 to function as a shock absorber, the sides of each member 7 are slotted in continuation of the slot in each head 16, as is best seen at 20 in Fig. 3. Thus upon a sudden stopping or starting of the vehicle that carries said carriers 4, it will be seen that the springs 18 will cushion the carriers against a detrimental shock by permitting slight movement of said carriers against the yieldable resistance of said springs.

In order to insure against any possibility of the projections 5 accidentally coming out of the slots in the ends of members 7, each head 16 of each member 7 is provided with an extension 21 that is telescopically slidable between ribs 6. This extension may be reinforced by a central rib 22 to give added strength in the event of an upward strain being placed on the member 7 by the carriers.

In operation, when the carriers are in rows as seen in Fig. 1, and the members 7 are in position with the projections 5 of the carriers in engagement with the disks 17 that are at opposite ends of springs 18 respectively in each of the said members, it will be seen that the carriers are securely, yet floatingly, held to the floor 1. By merely loosening the nuts 14 and by swinging the bolts outwardly away from the sides of said members, the latter are freed from securement to the floor and an entire row of carriers may be moved at one time on the floor with members 7 still between them, or the carriers may be successively unclamped from the floor.

In some instances it is found desirable to remove the clamping bolts 12 from the floor after unloading a vehicle or as the vehicle is unloaded, in which case a floor plate 25 (Fig. 5) may be provided. This floor plate may be formed with keyhole slots or openings 26 at the ends for receiving movably and holding the pivots 27 of bolts 28, the latter being shown without the nuts thereon. Bolts 29 may secure the plate 25 to floor 1 and the heads of said bolts at each end of the plate may be counter-sunk in recesses 30 in plate 25, if desired, and also the plate itself may be counter-sunk in floor 1 so no projections will be above the floor surface insofar as the plates 25 are concerned.

Having described the invention, I claim:

1. In combination with a vehicle having a freight supporting floor and a portable carrier for such freight on said floor, a pair of clamping members removably secured to said floor and spaced apart for receiving said carrier therebetween, means respectively on each of said members and on the ends of said carriers adjacent said members arranged and adapted to releasably inter-engage one with the other for securing each carrier to said floor, the said means consisting of a projection on each carrier and a recess formed in each member for receiving each such projection, a yieldable element in each recess adapted to yieldably engage each projection for yieldably holding said carrier between the said yieldable elements in said pair of members.

2. A device of the character described comprising a body member having a yieldable element thereon, means for removably clamping said member to a floor between a pair of portable freight carriers adapted to be supported on such floor, openings formed in opposite ends of said member providing access to opposite ends of said yieldable element for projections on such carriers, and projections adapted to be secured to such carriers formed for admission into said recesses for engagement with said ends of said element.

3. A device of the character described comprising a hollow elongated member having an expanded coil spring therein coaxial therewith, an end piece disposed between the ends of said spring and the ends of said member, openings formed in the ends of said member providing access to the said end pieces, recesses formed in opposite sides of said member for releasably receiving clamping members therein for releasably clamping said member to the floor of a vehicle, clamping members releasably fitted in said recesses, and slots formed in opposite sides of said member adjacent each opposite end thereof, each of the slots at each end of said member communicating at one of its ends with the said opening in the end adjacent thereto.

4. In combination with a vehicle having a freight supporting floor and portable carriers for such freight on said floor, a plurality of pairs of spaced clamping members secured to said floor in a row for receiving one of said carriers between each adjacent pair thereof, releasable interengaging means on each carrier and member respectively for holding each carrier to said floor between each adjacent pair of said members, the said means consisting of a projection on each carrier and a recess formed in each member for receiving such projection, and a yieldable element in each recess adapted to yieldably engage each projection for yieldably holding said carrier between the said yieldable elements in said pair of members.

5. In combination with a vehicle having a freight supporting floor and portable carriers for such freight on said floor, a plurality of pairs of spaced clamping members secured to said floor in a row for receiving one of said carriers between each adjacent pair thereof, releasable interengaging means on each carrier and member respectively for holding each carrier to said floor between each adjacent pair of said members, the said means consisting of a projection on each carrier and a recess formed in each member for receiving such projection, and a yieldable element in each recess adapted to yieldably engage each projection for yieldably holding said carrier between the said yieldable elements in said pair of members, tracks supporting said carriers against movement transversely of said row, each of said carriers having wheels supporting the same for movement on said tracks longitudinally of said row when said carriers are released from said members.

MORRIS P. TAYLOR.

REFERENCES CITED

The following references are of record in the file of this patent:

UNITED STATES PATENTS

| Number | Name | Date |
|---|---|---|
| 725,797 | Thompson | Apr. 21, 1903 |
| 1,843,988 | Randall | Feb. 9, 1932 |
| 1,859,076 | Dietrich | May 17, 1932 |
| 1,883,306 | Lewis | Oct. 18, 1932 |
| 1,922,632 | Owens | Aug. 15, 1933 |
| 2,103,751 | Kellett | Dec. 28, 1937 |